United States Patent
Everman et al.

(10) Patent No.: US 6,194,859 B1
(45) Date of Patent: Feb. 27, 2001

(54) X-Y POSITIONER BASED ON X AXIS MOTIONS

(76) Inventors: Michael R. Everman, 3822 Crescent Dr., Santa Barbara, CA (US) 93110; Michael S. Bell, 2694 Glendessary La., Santa Barbara, CA (US) 93105

( * ) Notice: Subject to any disclaimer, the term of this patent is extended or adjusted under 35 U.S.C. 154(b) by 0 days.

(21) Appl. No.: 09/255,387

(22) Filed: Feb. 22, 1999

(51) Int. Cl.$^7$ .................................................. G05B 19/04
(52) U.S. Cl. ................................ 318/568.2; 318/568.11; 318/568.16; 318/640; 901/16; 901/23; 901/46; 901/47; 414/730; 414/732
(58) Field of Search ............................ 318/568.2, 568.11, 318/568.16, 568.1, 568.12, 640; 414/730, 732; 901/16, 23, 46, 47

(56) References Cited

U.S. PATENT DOCUMENTS

| | | | |
|---|---|---|---|
| 1,274,554 | * | 8/1918 | Ives . |
| 1,794,798 | * | 3/1931 | Sarr . |
| 1,866,125 | * | 7/1932 | Patterson . |
| 2,932,487 | * | 4/1960 | Moe . |
| 3,708,681 | * | 1/1973 | Ivers .................................. 250/231 R |
| 3,729,669 | * | 4/1973 | Whitney et al. ...................... 318/594 |
| 4,208,045 | * | 6/1980 | Rowe et al. . |
| 5,063,334 | * | 11/1991 | Tanita et al. ......................... 318/568.1 |
| 5,557,185 | * | 9/1996 | Jacobsen et al. ............... 318/568.16 |
| 5,612,603 | * | 3/1997 | Kim ................................. 318/568.11 |
| 5,698,959 | * | 12/1997 | Yanagisawa ..................... 318/568.11 |
| 5,992,969 | * | 11/1999 | Armiñana Terrasa et al. ......... 347/37 |

FOREIGN PATENT DOCUMENTS 0 107 501 A2 * 5/1984 (EP) ................................ B41J/3/12

* cited by examiner

*Primary Examiner*—Karen Masih
*Assistant Examiner*—Edgardo San Martin
(74) *Attorney, Agent, or Firm*—Donald D. Mon

(57) ABSTRACT

Positioning apparatus to place a reference point at selected locations in a plane. Two carriages are independently mounted to a carriage rail. The rail bears location references and the carriage carry sensors responsive to them to learn their positions along the carriage rail. Guideways and guide rails are mounted in pairs to a respective carriage and to an interface member bearing the reference point. They form an angle between them such that the interface member moves in the plane as a function of the locations of the carriages along the axis and relative to each other. Drivers drive the carriages in response to commands related to the location of the carriages.

10 Claims, 4 Drawing Sheets

X-Y POSITIONER BASED ON X AXIS MOTIONS

FIELD OF THE INVENTION

A positioner to place a reference point at a desired location in an XY plane based on motions only along the X axis.

BACKGROUND OF THE INVENTION

Robotics, and specific movements for many other applications, require the movement of some reference point to any location in an X-Y plane, whereupon some event can occur precisely at that location. Positioners are well-known for such purposes. They are almost equally well-known for their complexity and high cost. The complexity they generally involve increases with the accuracy they are intended to deliver. Modern manufacturing processes call for increasing accuracy in order to improve the reliability and repeatability of produced products—a cost saving objective. This is countered by the increased cost of the production machinery, in which the precise placement of workpieces, or of circuit components is fundamental.

In addition, to be affordable these must function rapidly. Previous devices intended for rapid accurate movements tend to be heavy in order to provide the necessary rigidity, which in turn results in increased power requirements and more expensive positive sensing and powering components. For example, a Y axis carriage, motor and control placed physically on an X axis carriage, motor and control massively increases the need for rigidity and thereby the weight and the power to move quickly. These also drive up the cost of the positioner.

It is an object of this invention to provide an X-Y positioner which is able to control the movement of a reference point anywhere in a prescribed X-Y plane, utilizing only movements in the X axis to support and position both X and Y positioning devices and controls, thereby importantly reducing the cost and weight of the system, and improving its responsiveness.

BRIEF DESCRIPTION OF THE INVENTION

A positioner according to this invention includes a linear carriage guide rail, a first carriage and a second carriage both carriages being mounted to the said carriage guide rail for linear movement along it. While only a single rail is often required, heavier devices will sometimes employ a pair of X axis rails for stability. These may be consider a "single" X axis rail. In any event they are X axis rails for movements along that axis.

An encoder track (sometimes herein called a "reference track") parallels the carriage guide rail, it incorporates linear measurement indicia, such as spaced apart optical or magnetic elements that are recognizable. Each carriage carries a sensor responsive to the indicia on the encoder track so the location of the carriage can be known. A motor is carried by each of the carriages to move them independently of each other.

A rigid interface plate (sometimes herein called an "interface member") carries two linear interface rails. These rails are co-planar and non-parallel. A guideway is rigidly fixed to each carriage to hold a respective one of the interface guide rails for axial sliding linear movement, whereby movement of the carriages toward and away from each other will cause movement of the interface plate laterally relative to the axis of carriage movement (Y axis movement). Concurrent equal movement of the carriages in the same linear direction will shift the interface plate parallel to the carriage axis (X axis movement). The XY coordinates of the reference point are thereby known from the locations of the carriages along the carriage guide rail.

Feedback means and power means are provided to command movement of the individual carriages so as to determine the position of a reference point 65 on the interface plate in the XY plane. These may be of any known servo loop type, in which pulses are counted, recorded, and their data read out to command the movement of the motor (the coil and the motor track) to move the carriage as appropriate.

The interface plate may be provided with accessory equipment at or related to the reference point for carrying tools or articles to be placed, for example. The shape of the interface plate and the identity of what it carries is arbitrary.

According to a preferred but optional feature of the invention, the interface guide rails on the interface plate are parallel to sides of an isosceles triangle, the bisector of whose apex angle is normal to the X axis, that is, it is on the Y axis.

The above and other features of this invention will be fully understood from the following detailed description and the accompanying drawings, in which:

DETAILED DESCRIPTION OF THE INVENTION

Figure 3:
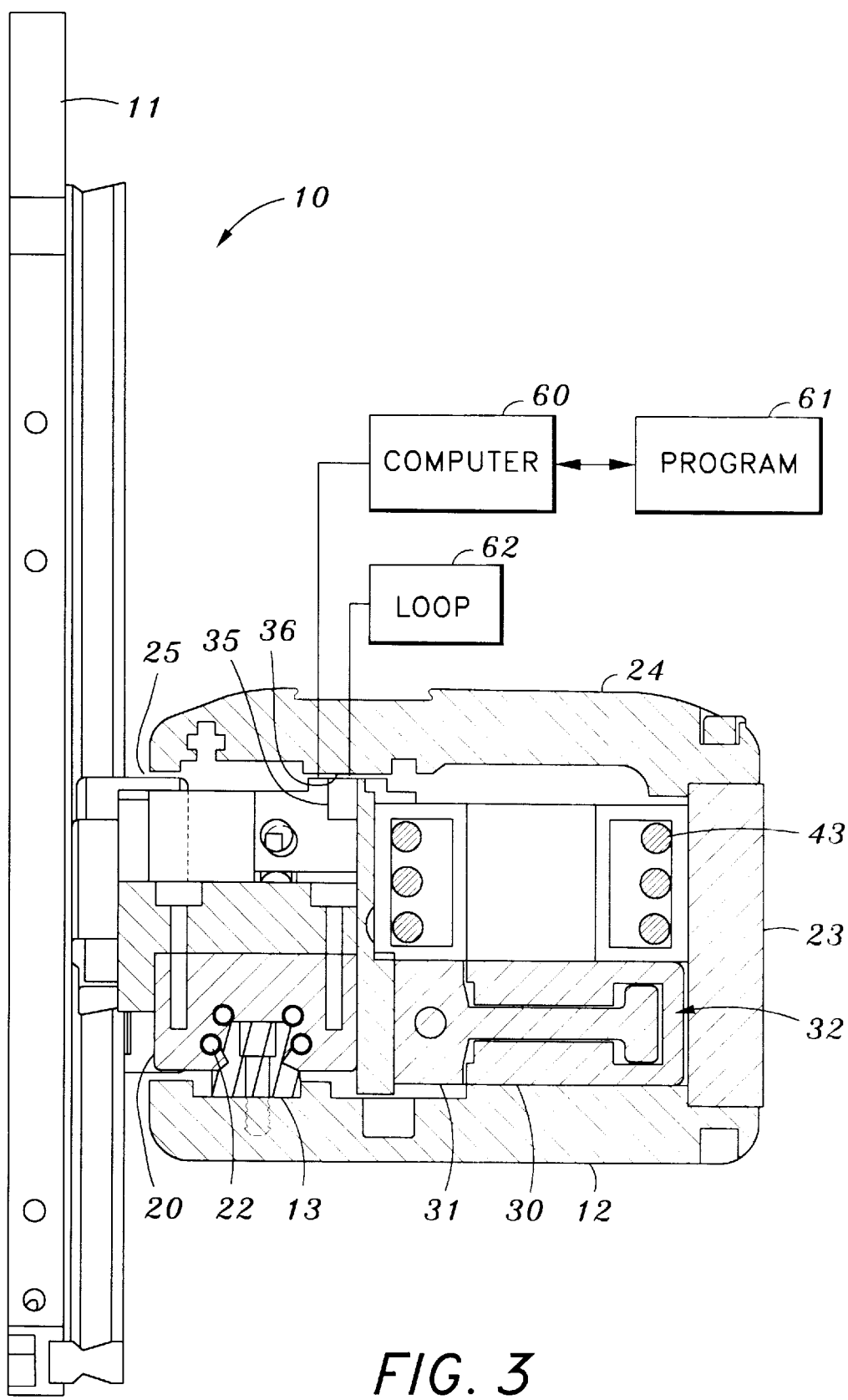
FIG. 3 is a cross-section taken at line 3—3 in FIG. 2.

The presently-preferred embodiment of this invention is shown in the drawings, in which a positioner 10 has as its function to shift an interface plate 11 in the X-Y plane. The positioner has a base plate 12 (FIG. 3) which supports a linear carriage rail 13. This very precise rail is accurately set parallel to the X axis 14 and in fact defines it. If desired, this rail may be duplicated to provide greater stability. It makes a dovetail sliding joinder with carriages 20 and 21. While a friction fitted dovetail arrangement may be used, in order to reduce power requirements and drag, typical roller or ball bearings 22 may be used to support the carriage on the carriage guide.

A spacer plate 23 is fixed to the base plate. A cover plate 24 is fixed to the spacer plate. This arrangement forms a channel 25, open at its edge facing toward the interface plate.

The carriages are identical, so only carriage 20 will be described in detail. A linear magnetic track 30 is mounted to the base plate, and the coil 31 of a linear motor 32 is fixed to the carriage so that actuating the coil will cause linear movement of the carriage along its guide rail. This is a conventional linear drive.

The carriage also carries an encoder read head 35 (sometimes herein called a sensor), which is sensitive to dimensional indicia (magnetic or optical) spaced apart by known distances on an encoder track 36. The read head faces upwardly to face and sense the indicia on the encoder track. The encoder track is fixed to the under side of the cover plate. Both the magnetic track and the encoder track are accurately parallel to the X axis. The read head is adapted to respond to the indicia on the encoder track that it passes, so that, once the location of the carriage along the guide rail and along the encoder track is known, then any change in carriage location will be measured by counting the indicia which it passes. Similarly, if a given movement is desired, instructions will be given to the motor to cause the carriage to travel past a calculated number of indicia. In this way, the locations of the two carriages will always be known.

Cable carriers 40, 41 are respectively attached to carriages 20 and 21. They are flexible and bend to accommodate X axis movement of the carriages. They connect the carriages through cables 43 to a source of power and commands.

Figure 4:
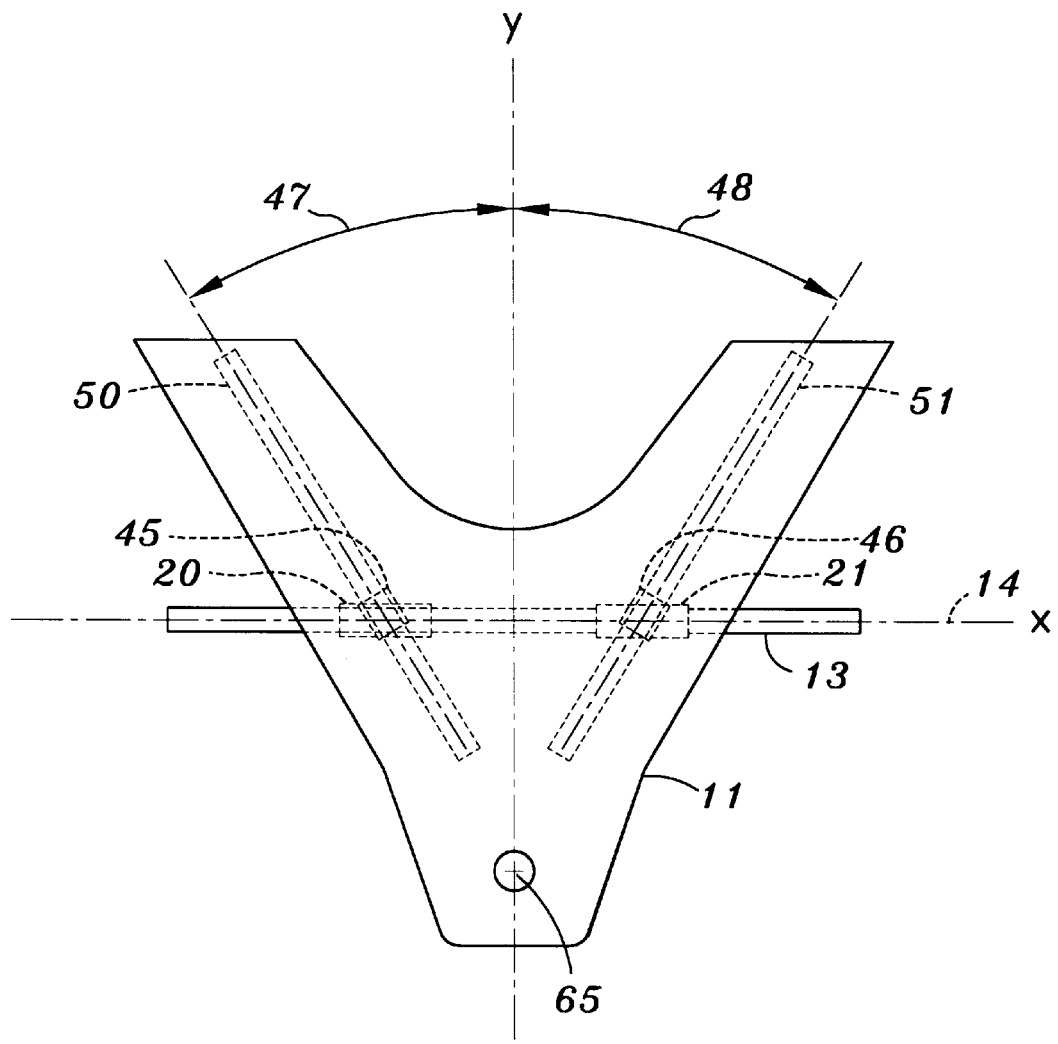
FIG. 4 is a schematic view showing the inter-related elements of the invention for a better understanding of the invention and FIG. 5 is a schematic side front view showing another arrangement of parts of the apparatus.

Carriages 20 and 21 carry respective guideways 45, 46. These are fixed at respective angles 47, 48 in the X-Y plane (FIG. 4). Interface plate 11 carries a pair of linear interface rails 50, 51 which are fixed to the interface plate and are accurately aligned with respective guideways 45 and 46, to which they are slidably mounted. The fit between the guideways and interface rails is very close and precise so that each of these rails will remain accurately aligned with the axis of the respective guideway despite the side loads that will be exerted on them.

It will be recognized that the rails could be fixed to the carriages and the guideways to the interface plate, to provide the same function.

Figures 1, 2:
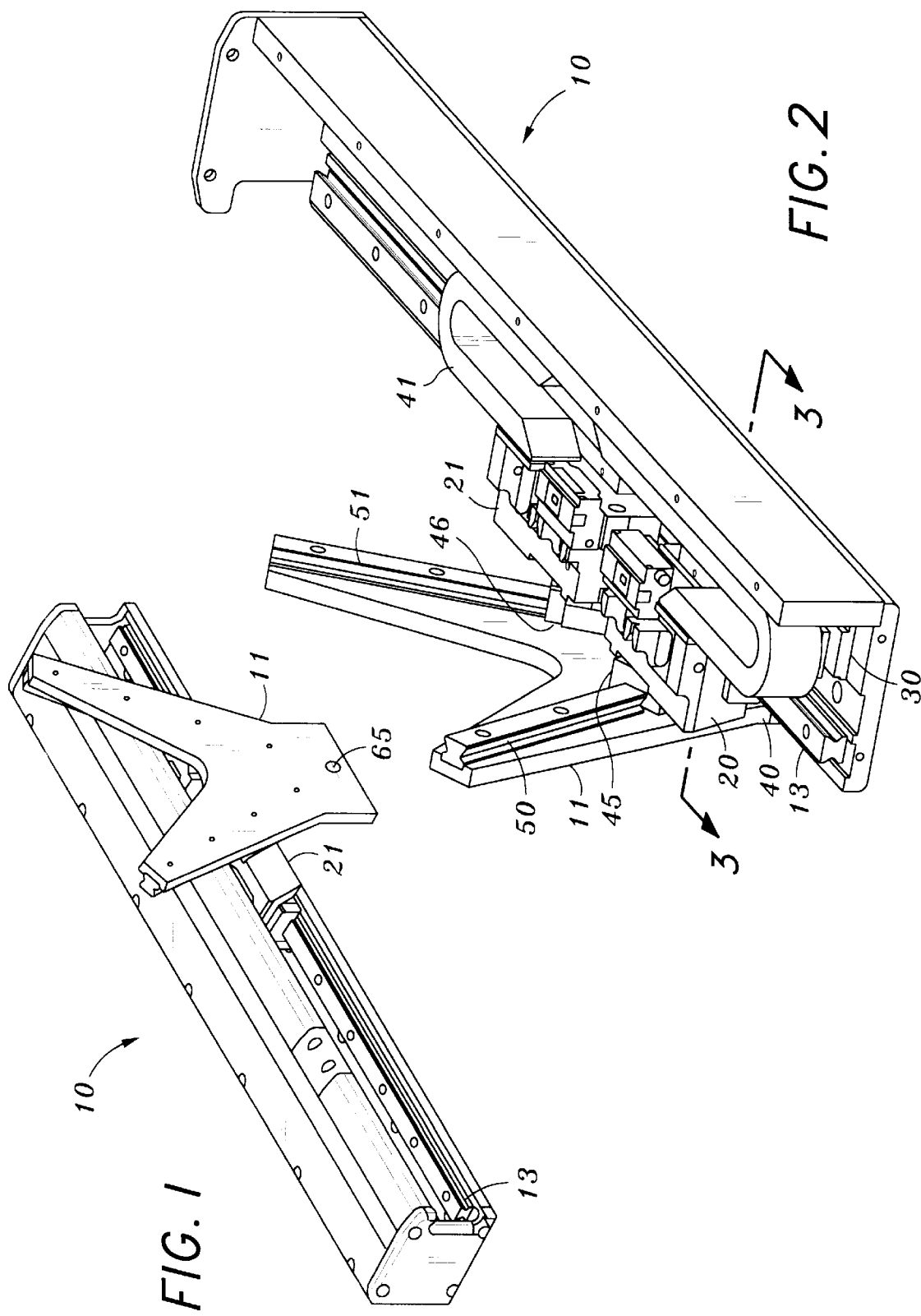
FIG. 1 is a rear view of FIG. 2.
FIG. 2 is an oblique view of the presently-preferred embodiment of the invention with a portion removed.
Figure 5:
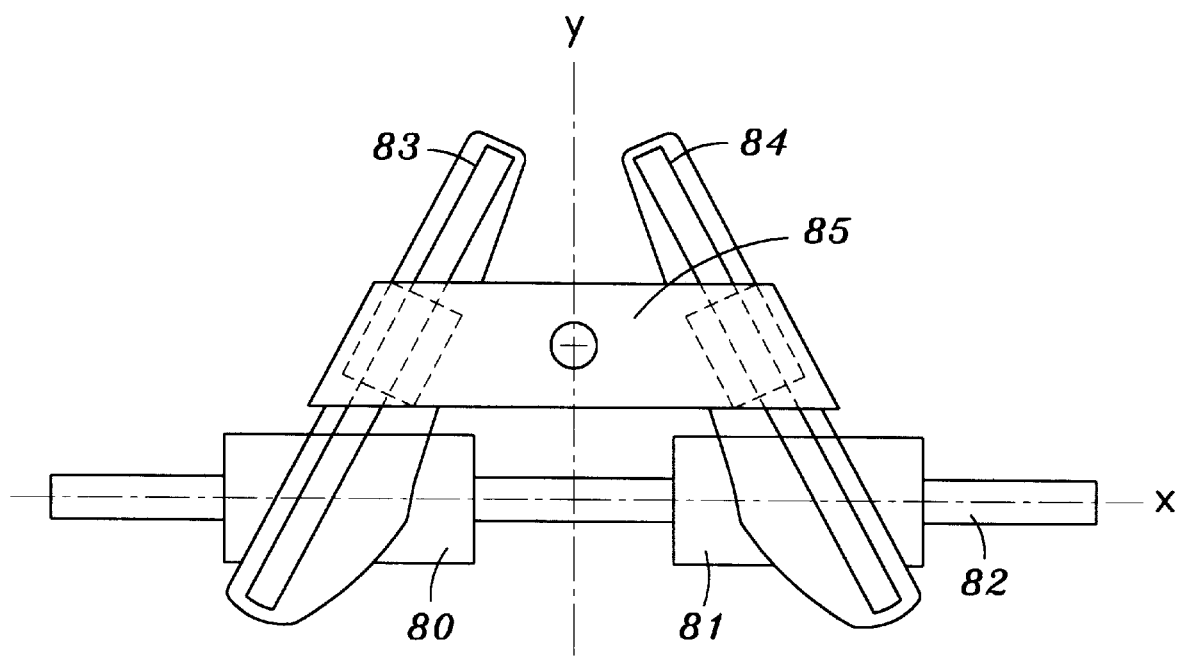

In fact, FIG. 5 shows such an arrangement, in which first and second carriages 80, 81 on carriage rail 82, and respectively rigidly mount a respective first linear guide rail 83, 84. An interface element 85 mounts guideways 86, 87 which respectively engage guide rails 83 and 84. This is a reversal of parts from the arrangement of FIG. 1.

In the preferred embodiment these rails form part of a respective leg of an isosceles triangle whose bisector is parallel to the Y axis. This arrangement is most convenient because it is symmetrical, and movement toward and away from the X axis will be precisely parallel to the Y axis. However there may be arrangements when a different relationship is desired. In such event, one interface rail may make a different angle to the X axis than the other.

The encoder strip is entirely passive, and the read head responds to the number of indicia lines that it passes when moving from one X axis position to the other. In order to learn or establish the position of the midpoint between the two carriages, and therefore know the location of the reference point 65 in the X-Y plane, one merely needs to know the position of each and add or subtract one-half of the difference between them, to know its location.

To learn or to establish the Y coordinate, when the interface rails make equal angles with the X axis, the Y axis location (adjusted for the actual basic position) will be calculated as one half the spacing between the read heads times the cotangent of one-half the apex angle of the isosceles triangle. It is a straight forward trigonometric calculation reading performed by any suitable computer. When different coordinates are desired, it is only necessary to calculate the new locations of the carriages and command the necessary movements of the carriages.

The drawing schematically shows a computer 60 responsive to the read heads, a program 61 to provide instructions for the motors to move the carriages and read heads by an intended amount, and a closed servo loop to 62 to assure that the commands have been followed.

It will be seen that the elements of this device are minimal in size and weight. Movement along both axes is determined by motors and carriages which move only along the X axis, and no structural element respective to movement along either axis must be carried by an element of the other.

This invention is not to be limited by the embodiments shown in the drawings and described in the description, which are given by way of example and not of limitation, but only in accordance with the scope of the appended claims.

We claim:

1. A positioner physically to place a reference point at selected locations in a plane defined by a first axis and a second axis, said axes being non-parallel, said positioner comprising:

a base;

a linear carriage rail mounted to said base and parallel to said first axis;

a reference track mounted to said base parallel to said first axis which bears indicia respective to locations along the first axis;

a first carriage and a second carriage movably mounted to said carriage rail for movement along said first axis independently of one another;

a first sensor mounted to said first carriage and a second sensor mounted to said second carriage, said sensors being maintained in proximity to said reference track to sense passage of the sensors past said indicia, whereby the movement and location of said carriages can be learned;

an interface member to provide a basis for said reference point;

a first linear guide rail and a second linear guide rail;

a first guideway and a second guideway;

said first and second carriages mounting either respective first and second guideways, or first and second guide rails, and said interface member mounting either both of said guide rails or both of said guideways;

said guideways holding said guide rails in the said plane and forming a constant angle between them, whereby equal movement of the two carriages in the same direction along the first axis moves the interface member only along the first axis, and differential movement between them along the first axis causes the interface member to move laterally to the first axis with at least a component of movement along said second axis;

a first driver and a second driver respective to said first and second carriages to move said first and second carriages to cause said interface member to move said reference point to a desired location known from the interaction between said sensors and the indicia on said reference track.

2. Apparatus according to claim 1 in which said interface guide rails each form part of a respective leg of a triangle whose apex is spaced from the carriage rail and whose base is parallel to the first axis.

3. Apparatus according to claim 2 in which said triangle is isosceles.

4. Apparatus according to claim 1 in which said indicia is magnetic or optical.

5. Apparatus according to claim 1 in which servo means senses the positions of the carriages and compares their position with a desired position.

6. Apparatus according to claim 1 in which said carriage rail is a single rail to which both carriages are mounted.

7. Apparatus according to claim 1 in which said drivers comprises a magnetic track on said base, and coil means on each of said carriages.

8. A positioner according to claim 1 in which both of said guideways are mounted to said reference member, and said first and second guide rails are mounted to said first and second carriages.

9. A positioner according to claim 1 in which both of said guide rails are mounted to said reference member, and said first and second guideways are mounted to said first and second carriages.

10. A positioner according to claim 1 in which said interface member is rigid and adapted to mount a next article.

* * * * *